(12) United States Patent
Ajima et al.

(10) Patent No.: US 10,911,375 B2
(45) Date of Patent: Feb. 2, 2021

(54) PROCESSOR AND INFORMATION PROCESSING APPARATUS FOR CHECKING INTERCONNECTS AMONG A PLURALITY OF PROCESSORS

(71) Applicant: FUJITSU LIMITED, Kawasaki (JP)

(72) Inventors: Yuichiro Ajima, Kawasaki (JP); Shinya Hiramoto, Yokohama (JP); Yuji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/387,987

(22) Filed: Apr. 18, 2019

(65) Prior Publication Data

US 2019/0334836 A1   Oct. 31, 2019

(30) Foreign Application Priority Data

Apr. 25, 2018   (JP) ................................ 2018-083849

(51) Int. Cl.
| | | |
|---|---|---|
| *H04J 3/14* | (2006.01) | |
| *H04L 12/933* | (2013.01) | |
| *H04L 12/935* | (2013.01) | |
| *H04L 12/937* | (2013.01) | |

(52) U.S. Cl.
CPC ............ *H04L 49/15* (2013.01); *H04L 49/254* (2013.01); *H04L 49/30* (2013.01)

(58) Field of Classification Search
CPC ....... H04L 49/15; H04L 49/254; H04L 49/30; H04J 3/14; H04J 1/16
See application file for complete search history.

(56) References Cited

U.S. PATENT DOCUMENTS

| | | | |
|---|---|---|---|
| 2006/0143359 A1* | 6/2006 | Dostert ............... | G06F 11/3055 711/6 |
| 2013/0242757 A1* | 9/2013 | Tsai ........................ | H04L 12/44 370/244 |
| 2014/0016648 A1 | 1/2014 | Hidaka | |
| 2018/0026918 A1* | 1/2018 | Kumar ................ | G06F 13/1694 370/401 |

FOREIGN PATENT DOCUMENTS

| | | |
|---|---|---|
| JP | 2000-293495 | 10/2000 |
| WO | 2012/128282 | 9/2012 |

* cited by examiner

*Primary Examiner* — Wei Zhao
(74) *Attorney, Agent, or Firm* — Fujitsu Patent Center (57) ABSTRACT

An information processing apparatus includes a plurality of processors and a plurality of links provided between the processors in a plurality of axis directions. Each of the processors includes a processor circuit, a memory, a memory controller, and an interconnect coupled to the processor circuit. The interconnect includes: a network switch configured to perform switching between the first links and a second link to its own processor; link counters provided to input links and output links of the first links and the second link respectively, the link counters being configured to count at least the number of packets passing through the input links and the output links; and a recorder configured to store count values of the link counters in the memory via the memory controller without a control by the processor circuit.

16 Claims, 11 Drawing Sheets

PROCESSOR AND INFORMATION PROCESSING APPARATUS FOR CHECKING INTERCONNECTS AMONG A PLURALITY OF PROCESSORS

CROSS-REFERENCE TO RELATED APPLICATION

This application is based upon and claims the benefit of priority of the prior Japanese Patent Application No. 2018-83849, filed on Apr. 25, 2018, the entire contents of which are incorporated herein by reference.

FIELD

The embodiment discussed herein is related to a processor and an information processing apparatus.

BACKGROUND

A parallel computer such as a super computer includes a plurality of processors that are coupled with one another with interconnects, and the processors execute an application in parallel. In the parallel processing of the application, the processors communicate one another with their interconnects via inter-node links (hereinafter, simply referred to as links) that couple the processors.

Specifically, a processor in a node receives a computation result of another processor that is in parallel operation by communication or sends its own computation result to another processor. Information processing apparatuses in which nodes of a plurality of processors are coupled with one another over a network are discussed in International Publication Pamphlet No. WO 2012/128282 and Japanese Laid-open Patent Publication No. 2000-293495.

An interconnect includes, for example, a network interface device that generates a transmission packet and sends the transmission packet to a destination processor in response to a data transmission request from the processor and receives a reception packet received from another processor and provides the data of the reception packet to the processor. The interconnect further includes a network switching device that performs switching among a plurality of links including links for sending packets to other processors and a link to its own processor.

In a parallel computer, in addition to the throughput of processing performed by a processor in each node, the throughput of inter-processor communication may largely affect the overall throughput. For example, in a specific process of an application being processed in parallel, an increased communication delay due to concentrated communication to a specific link may cause a decrease in the application execution performance in the parallel computer. In order to improve such performance deterioration, the application program may be modified.

To modify the program, the link to which the communication is concentrated is to be located.

An object of a first aspect of the embodiment is to provide a processor and an information processing apparatus for acquiring information for checking link utilization in a switch in an interconnect.

SUMMARY

According to an aspect of the embodiments, an information processing apparatus includes a plurality of processors and a plurality of links provided between the processors in a plurality of axis directions. Each of the processors includes a processor circuit, a memory, a memory controller, and an interconnect coupled to the processor circuit. The interconnect includes: a network switch configured to perform switching between the first links and a second link to its own processor; link counters provided to input links and output links of the first links and the second link respectively, the link counters being configured to count at least the number of packets passing through the input links and the output links; and a recorder configured to store count values of the link counters in the memory via the memory controller without a control by the processor circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
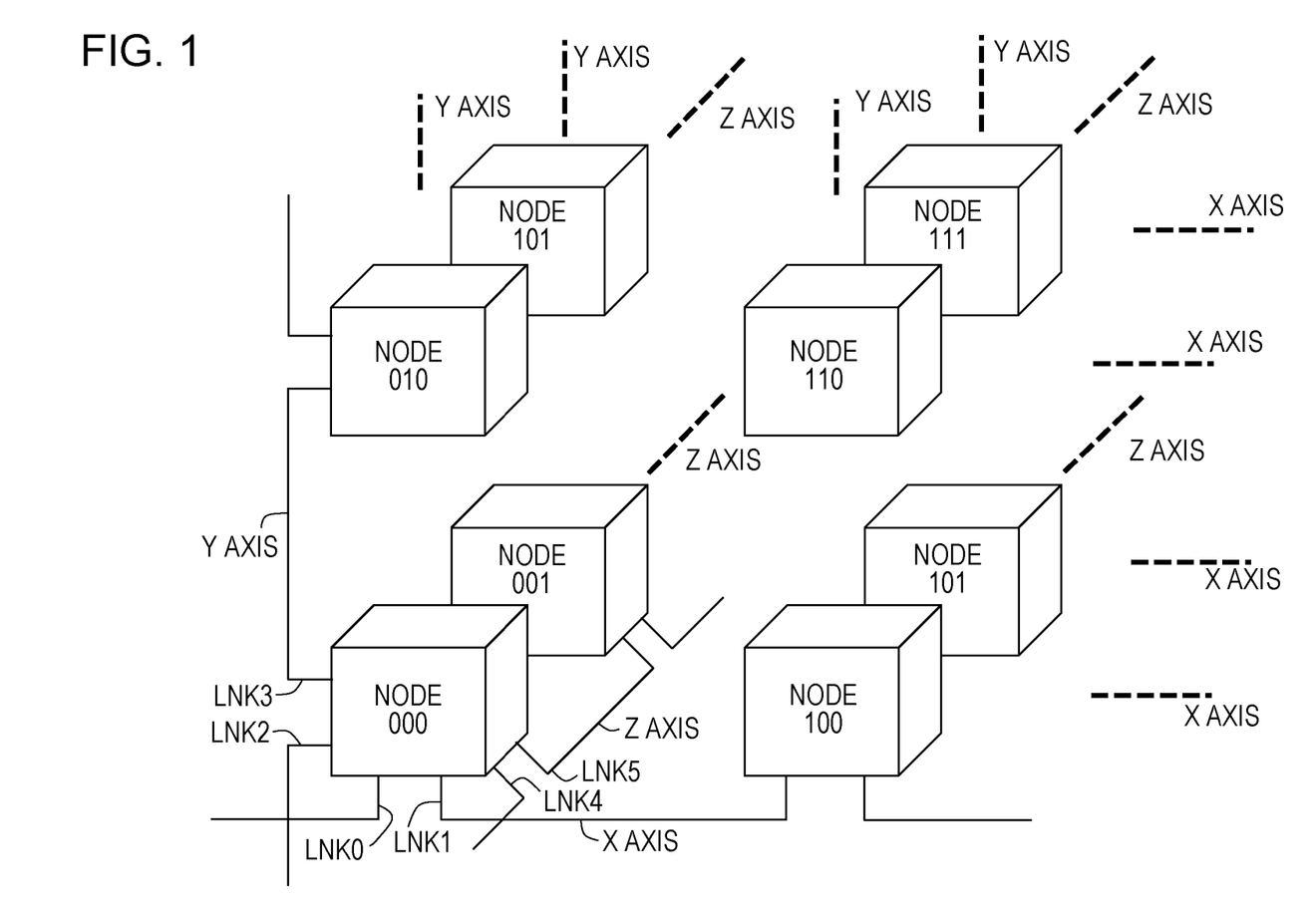
FIG. 1 illustrates a plurality of configurations in a parallel computer such as a super computer.

FIG. 1 illustrates a plurality of configurations in a parallel computer such as a super computer. As illustrated in FIG. 1, a plurality of nodes NODE000 to NODE111 are coupled by a multidimensional network among nodes. Specifically, the parallel computer includes a plurality of nodes NODE000 to NODE111 that are logically arranged in an X axis direction, a Y axis direction, and a Z axis direction, links between the nodes in the X axis direction, links in the Y axis direction, and links in the Z axis direction. The X axis direction denotes a horizontal direction in FIG. 1, the Y axis direction denotes a vertical direction, and the Z axis direction denotes a depth direction in FIG. 1. Each node NODE is a processor node (or a computer node) that includes a processor therein.

FIG. 1 illustrates links LNK0 to LNK5 that are coupled with the node NODE000 among the nodes, and illustrates some of the links of the other nodes and some links are omitted.

The node NODE000 is coupled with the LNK0 and the LNK1 in the X axis direction, the LNK2 and the LNK3 in the Y axis direction, and the LNK4 and the LNK5 in the Z axis direction. The plurality of links in the X axis direction couple between the NODE000 to the NODE100 arranged in the X axis direction. The links in the X axis direction couple, for example, the nodes in the X axis direction in a torus topology by a link (not illustrated) that couples nodes at the right and left ends. This applies similarly to the Y axis direction and the Z axis direction. Accordingly, the example illustrated in FIG. 1 is a three-dimensional mesh/torus network.

For example, a packet that is transmitted over the link LNK0 toward the node NODE100 is transferred to the link LNK1 via a network router (not illustrated) in the node NODE000 and received by the processor in the next node NODE 100. In another example, a packet that is transmitted over the link LNK0 toward the node NODE001 is transferred to the link LNK5 in the Z axis direction via the network router in the node NODE000 and received by the processor in the next node NODE001.

As described above, the network router that is disposed in each node determines whether to transfer a packet that is transmitted over a link to a link adjacent in the same axis or to a link in a different axis based on the destination node address, and transfers the packet to the determined link (destination link). When a destination node address of a packet that is transmitted over a link indicates its own node address, the network router that is disposed in each node instructs its own processor to acquire the data in the packet without transferring the packet to another link.

The parallel computer executes an application in parallel by using a plurality of processors. The processors are provided in the nodes in FIG. 1 respectively. In executing the application in parallel by the processors, a processor acquires an operation result of another processor by packet communication and refers to the acquired operation result in operation processing performed by itself. The processor sends its own operation result to a certain processor by packet communication.

The nodes that are coupled with the links in the axes determine a transfer destination link (destination link) for a transmitted packet and transfer the packet to the transfer destination link in accordance with a predetermined packet transfer rule. The nodes transfer packets to transfer destination links respectively, and thereby the packets communicated between the nodes are transmitted from source nodes to destination nodes via intermediate transfer nodes.

Each link illustrated in FIG. 1 is a bidirectional link that has an input link and an output link to a certain node as will be described below. Accordingly, each node receives packets via the input links of coupled links and sends the packets via the output links of the links. Consequently, in the example of the nodes in FIG. 1, to each node (for example, the node NODE001), two links LNK0 and LNK1 in the X axis direction are coupled, two links LNK2 and LNK3 in the Y axis direction are coupled, and two links LNK4 and LNK5 in the Z axis direction are coupled.

Note that the links in the X, Y, and Z axis directions are merely examples, and links in the other axis directions may be coupled. Furthermore, the X, Y, and Z axes may be logical axes.

Figure 2:
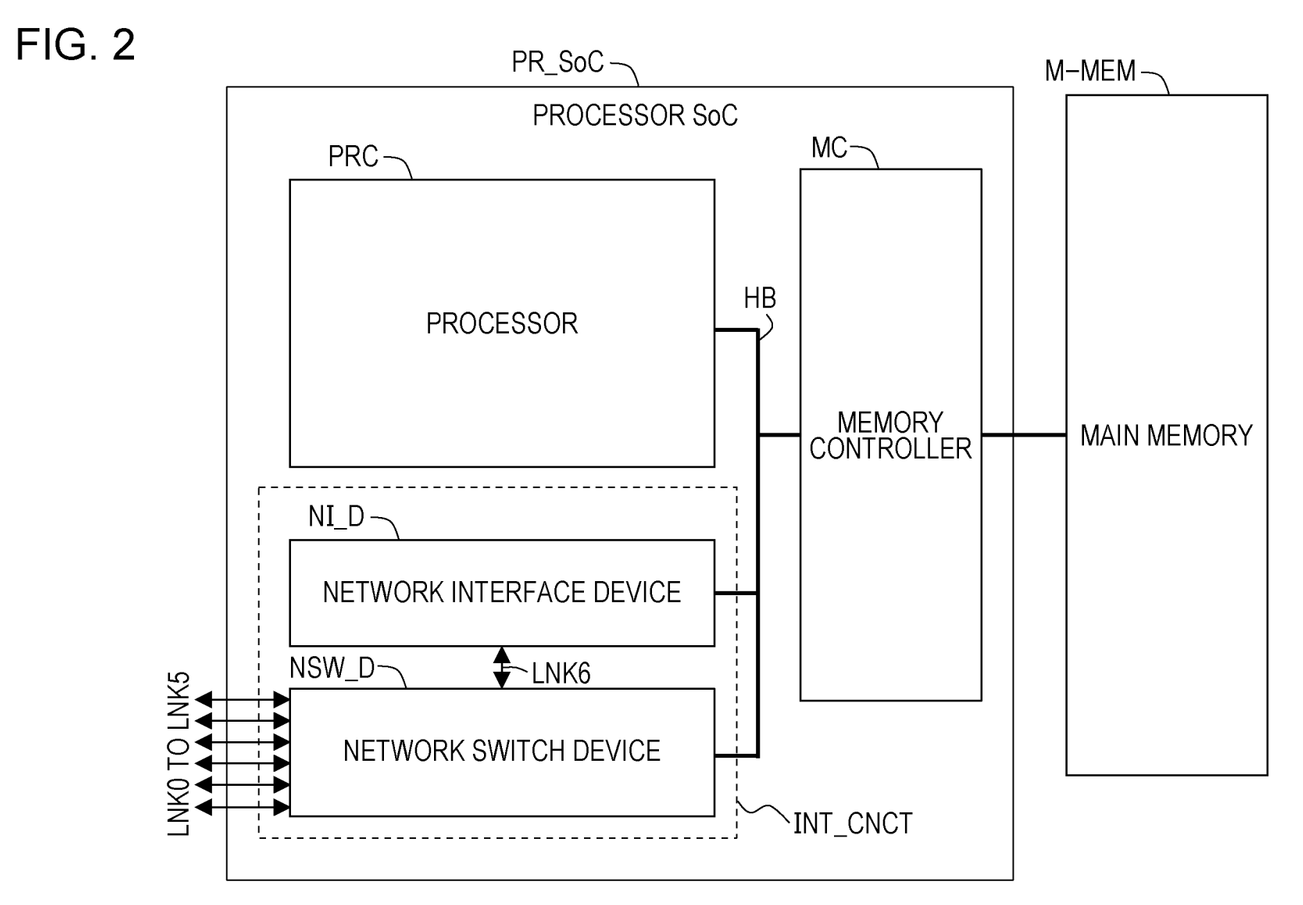
FIG. 2 illustrates an example configuration of a processor according to an embodiment.

FIG. 2 illustrates an example configuration of a processor according to an embodiment. A processor SoC (system on chip) or a processor chip PR_SoC includes a processor PRC, which is a processor circuit that includes an arithmetic processing circuit, a memory controller MC, and an interconnect INT_CNCT, which is disposed in a one-to-one relationship with the processor PRC. The processor PRC, the memory controller MC, and the interconnect INT_CNCT are coupled via a host bus HB. The memory controller MC controls access to a main memory M_MEM that is provided outside the processor SoC.

The interconnect INT_CNCT includes a network interface device NI_D and a network switch device NSW_D. The network interface device (hereinafter, simply referred to as network interface) NI_D sends and receives data in the main memory to the network switch device NSW_D. The network interface generates a packet to be sent to another processor in response to an instruction issued by the processor PRC, which is a processor circuit, and stores data of a packet received from another processor in the main memory and provides the data to the processor PRC.

The network switch device (hereinafter, simply referred to as network switch) NSW_D performs switching between first links LNK0 to LNK5, which are coupled to other processor nodes, and a second link LNK6, which is coupled to its own processor.

The network switch NSW_D is coupled to other processors SoC via the links, and transfers a packet transmitted over a link from another processor to another link or its own link. The network switch includes a switch (not illustrated) that performs switching between the first links LNK0 to LNK5, which are coupled to the other processor nodes, and the second link LNK6, which is coupled to its own processor. The switch determines a transmission destination link for outputting a packet based on a transmission destination address of the packet that is input from a link and performs switching control so as to transfer the input packet to the transmission destination link. Specific operation will be described below.

Figure 3:
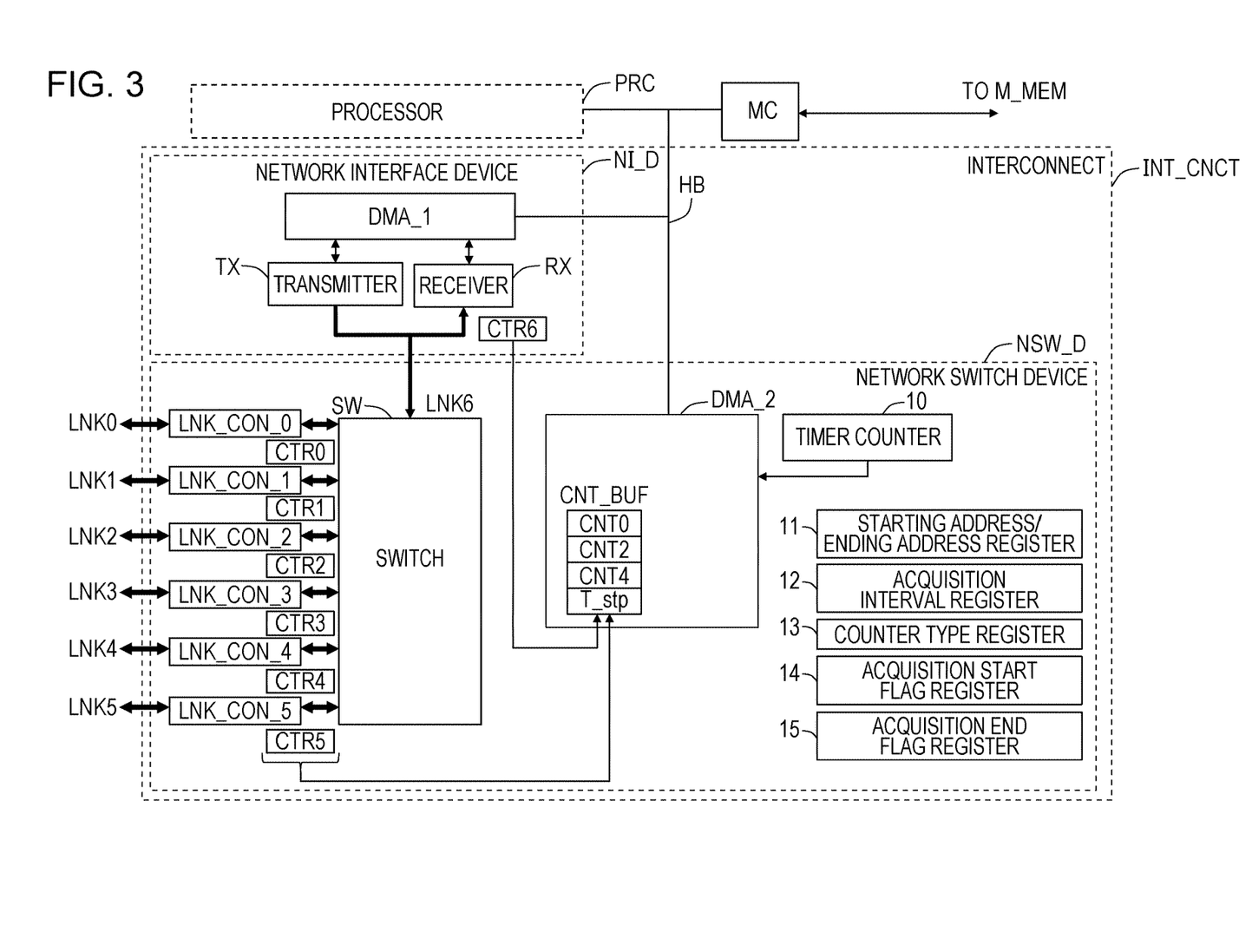
FIG. 3 illustrates components in a processor.

FIG. 3 illustrates components in the processor SoC. FIG. 3 illustrates an example configuration of the interconnect INT_CNCT in the processor SoC that includes the network interface NI_D and the network switch NSW_D. FIG. 3 also illustrates the processor PRC that serves as an arithmetic processing unit and the memory controller MC that are the components of the processor SoC in FIG. 2.

The network interface NI_D includes a receiver RX, a transmitter TX, and a first direct memory access arbiter or controller DMA_1. The receiver RX receives a packet that has been received by the network switch NSW_D. The transmitter TX generates a transmission packet in response to an instruction from the processor PRC and outputs the transmission packet to the network switch device NSW_D via the second link LNK6. The first direct memory access arbiter or controller DMA_1 accesses the main memory M_MEM without the control by the processor PRC. The first DMA controller DMA_1 in the network interface NI_D writes data in a received packet in the main memory M_MEM in response to a request from the receiver RX, and reads the data in the main memory and provides the data to the transmitter TX in response to a transmission instruction from the processor.

The network switch NSW_D includes a switch SW that couples the first links LNK0 to LNK5, which are coupled to interconnects of other processors, and the second link LNK6, which is coupled to its own network interface. Between the switch SW and the first links LNK0 to LNK5, link controllers LNK_CON_0 to LNK_CON_5 are provided respectively. The link controllers temporarily store received packets transferred from the first links LNK0 to LNK5 in reception buffers and input the received packets in the switch SW, and output transmission packets output from the switch SW to transmission destination links respectively. When output transmission packets are not transferred to transmission destination nodes, the link controllers output again the transmission packets.

The network switch NSW_D also includes link counters CTR0 to CTR5 that are provided in the first links LNK0 to LNK5 respectively. The network interface NI_D includes a link counter CTR6 that is provided in the second link LNK6. The link counter CTR6 may be provided in the network switch NSW_D.

As described above, each of the first links LNK0 to LNK5 and the second link LNK6 includes an input link and an output link. Accordingly, the link counters CTR0 to CTR5 and CTR6 include link counters on the input link side and link counters on the output link side of the links LNK0 to LNK5 and link LNK6 respectively.

The link counters count various visualization information. For example, the visualization information includes the number of packets that pass through the input link and the output link of each link and the amount of data of packets that pass through the input link and the output link of each link.

For example, the counting of the number of packets and the adding of the data amount of packets in the link counters CTR0 to CTR5 of the first links LNK0 to LNK5 are controlled by the link controllers LNK_CON that analyze received packets and transmission packets. Similarly, the counting of the number of packets and the adding of the data amount of packets in the link counter CTR6 of the second link LNK6 are controlled by the receiver RX that receives received packets and the transmitter TX that generates transmission packets and outputs the transmission packets to the switch SW.

The network switch NSW_D also includes a second DMA arbiter or controller DMA_2 that acquire predetermined count values from the link counters CTR0 to CTR6 at a predetermined acquisition interval and stores the count values in a visualization information recording area in the main memory M_MEM. The second DMA controller DMA_2 includes a circuit (not illustrated) that performs direct memory access control to the main memory and a count value buffer CNT_BUF that temporarily store count values acquired from predetermined link counters.

The network switch NSW_D also includes various device registers 11 to 15 that set a method of acquiring a count value in a link counter and a timer counter 10. The timer counter 10 is a timer provided in the network switch and serves as a free-run timer counter that initializes the processor SoC and starts counting up. The timer counter 10, however, may not be disposed in the network switch, and may be disposed in the network interface or in the processor SoC that is outside the interconnect INT_CNCT. Alternatively, the timer counter 10 may be disposed outside the processor SoC and may be a timer that is referred to by the processor PRC.

The device registers include the starting address/ending address register 11 that sets a starting address and an ending address of a storage area in the main memory that stores count values of link counters. The starting address/ending address register 11 defines a storage area in the main memory for storing count values of link counters, and thus, for example, a starting address and an area size may be set.

The device registers include the acquisition interval register 12 in which a time interval for acquiring a count value of a link counter is set and the counter type register 13 in which the type of link counter for acquiring a count value is set. In the counter type register, data that specifies a link counter for acquiring a count value that is visualization information or the like is set.

In the above description, the link counter type includes the packet number counter and the data number counter; however, the link counter type may include counters that counts other visualization information such as the number of read packets for reading data in another processor or the number of write packets for writing data in a main memory in another processor.

The device registers also include the acquisition start flag register 14 and the acquisition end flag register 15. The acquisition start flag register 14 instructs the start of acquisition of a count value of a link counter. The acquisition end flag register 15 instructs the end of acquisition.

To the device registers, the processor PRC, which serves as a processor circuit, sets predetermined setting values based on a setting instruction in an application to be executed. Specific settings of the device registers will be described in detail below.

As described above, the processor SoC or the processor chip PR_SoC according to the embodiment includes the interconnect INT_CNCT within the same chip as the processor PRC. The processor SoC includes the link counters that count the number of packets that pass through the respective links or data amounts that are information (visualization information or link communication state visualization information) for visualizing link utilization of the network switch in the interconnect. The second DMA controller DMA_2 acquires a count value of a link counter for profiling at a predetermined timing and at a predetermined acquisition interval and temporarily stores the count value in the count value buffer CNT_BUF. Then, the second DMA controller DMA_2 stores the count value that has been acquired in the count value buffer in the main memory M_MEM together with a time stamp at the time of acquisition in the timer counter by direct memory access without transferring the data to the processor PRC.

The second DMA controller DMA_2 stores the acquired count value in the main memory by direct memory access without the control by the processor PRC. Accordingly, the profiling of visualization information does not affect the throughput of the execution of the application by the processor PRC and also does not affect the transmission and reception timing of transmission and reception packets by the interconnect.

The parallel computer calculates a large amount of data, so it is desirable to control the capacity of the area for storing visualization information in the main memory to a predetermined capacity or less. For this purpose, the processor sets, by an initialization instruction of the application to be executed, a starting address and an ending address in the main memory for defining a storage area of visualization information in the main memory to the starting address/ending address register 11. With this setting values, the parallel computer regulates the area for storing visualization information in the main memory to a predetermined capacity or less.

In such a case, it is preferable that the visualization information storage area be used as a ring memory. A count value of a link counter as visualization information is stored in the main memory together with a time stamp that indicates the acquisition time, and thus the time-based relationship of the visualization information in the ring memory can be determined by the time stamp.

The processor PRC further sets an acquisition start flag to the acquisition start flag register 14 and sets an acquisition end flag to the acquisition end flag register 15 in response to an acquisition start flag setting instruction and an acquisition end flag setting instruction in the application to be executed.

The processor PRC acquires a time stamp in the timer counter 10 when setting the acquisition start flag or the acquisition end flag. Based on a difference between the time stamp and the time stamp of a profiled count value of a link counter, the processor determines to which process of parallel calculation the acquired count value corresponds.

The processor PRC sets the types of link counters for visualization information to be acquired to the counter type register 13 in response to an initialization instruction of the application to be executed. With this setting, the second DMA controller DMA_2 performs profiling of the count values of the link counters that correspond to predetermined visualization information.

The second DMA controller may write counter type IDs in the main memory in addition to the count values of the link counters and the time stamp at the time of acquisition of the count values in the timer device. However, in the initialization processing, the data for specifying the counter types for the acquisition of the count values is set. Accordingly, in the configuration in which the second DMA controller stores the acquired count values in the count value buffer CNT_BUF in the order of the set counter types and adds the time stamp and stores the count values and time stamp in the main memory, the counter type IDs of the count values acquired in the main memory may not be stored.

Figure 4:
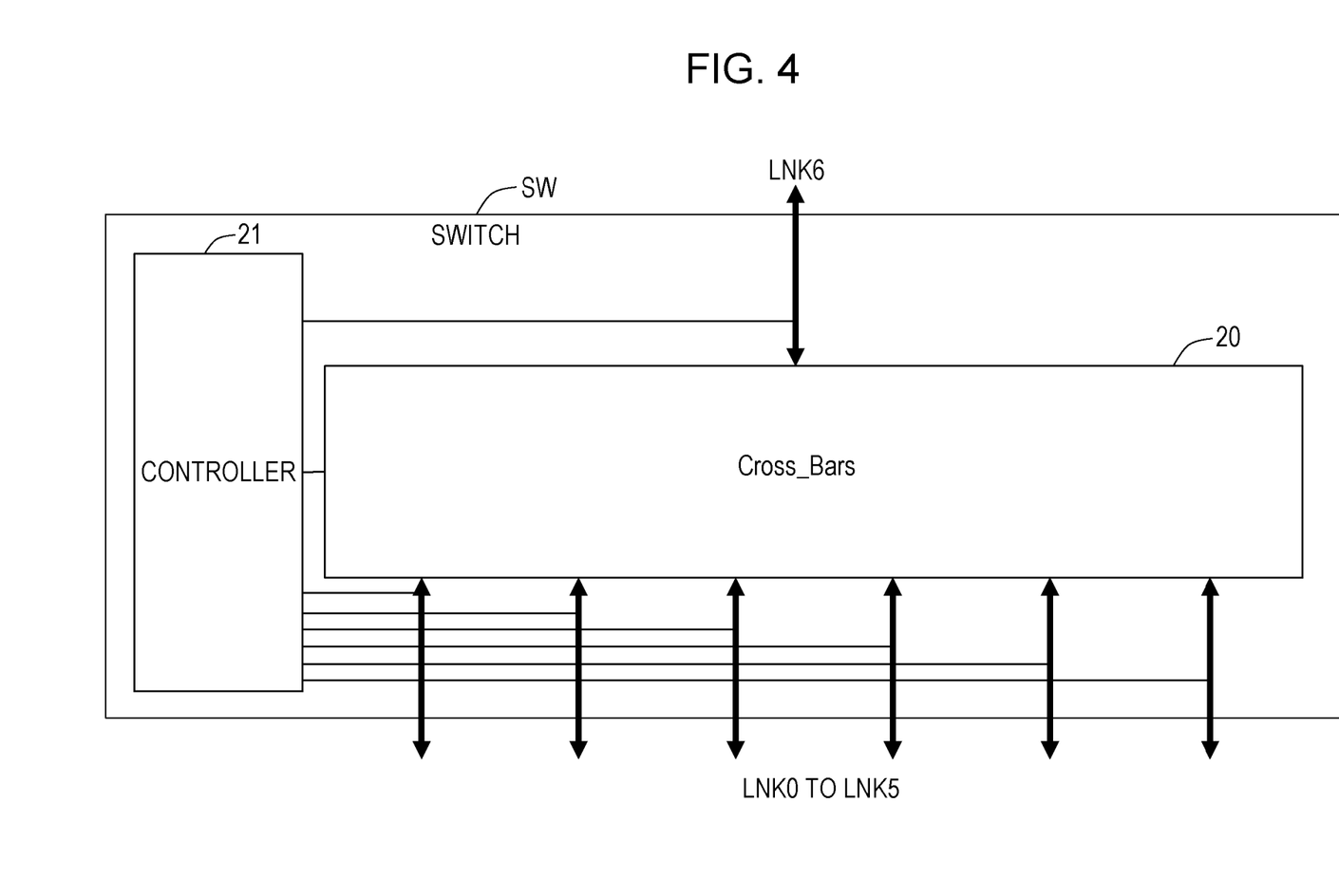
FIG. 4 illustrates a configuration of a switch in a network switch.

FIG. 4 illustrates a configuration of the switch SW in the network switch NSW D. The switch SW includes a crossbar switch 20 and a controller 21. The crossbar switch 20 performs switching between the six first links LNK0 to LNK5 and the second link LNK6. The controller 21 controls switching of the crossbar switch 20. As described above, each link is a bidirectional link that has an input link and an output link.

The controller 21, which will be described below, determines an output destination link (transmission destination link) of an input packet input from the input link of each link, arbitrates input packets competing in the same output link, and gives an output permission to the input packet of one of the links. Here, the term "competing" refers to the fact that two or more transfer requests are issued for the same link. Then, the controller 21 controls switching of the crossbar switch such that the input packet is switched to the transmission destination link.

Figure 5:
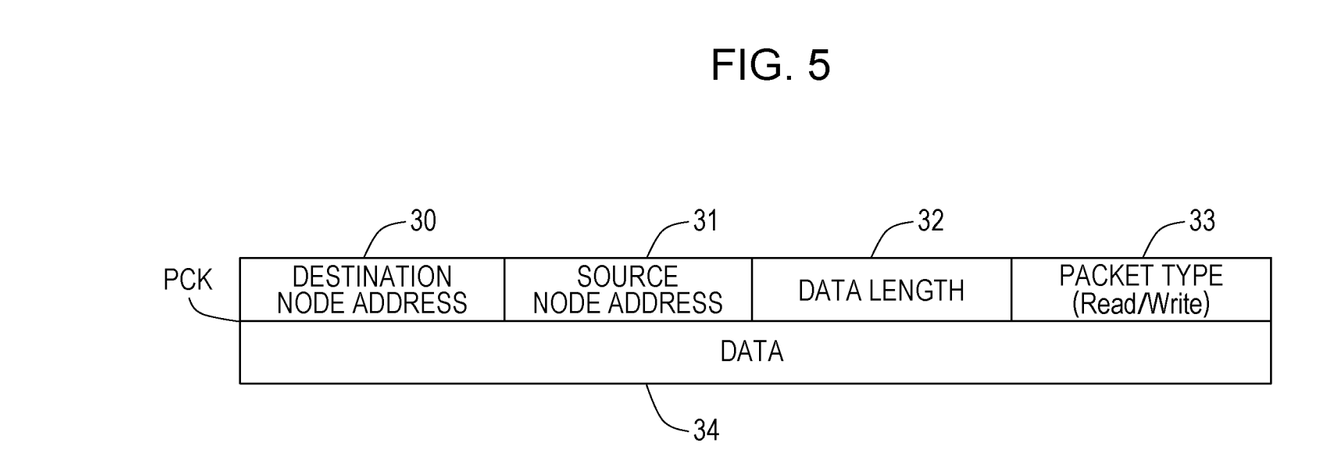
FIG. 5 illustrates an example format of a communication packet to be transferred between processor nodes.

FIG. 5 illustrates an example format of a communication packet to be transferred between processor nodes. A communication packet PCK stores, as header information, a transmission destination node address 30, a source node address 31, a data length 32, and a packet type 33 that indicates write or read, and also stores data 34 that indicates, for example, write or read as a payload.

Figure 6:
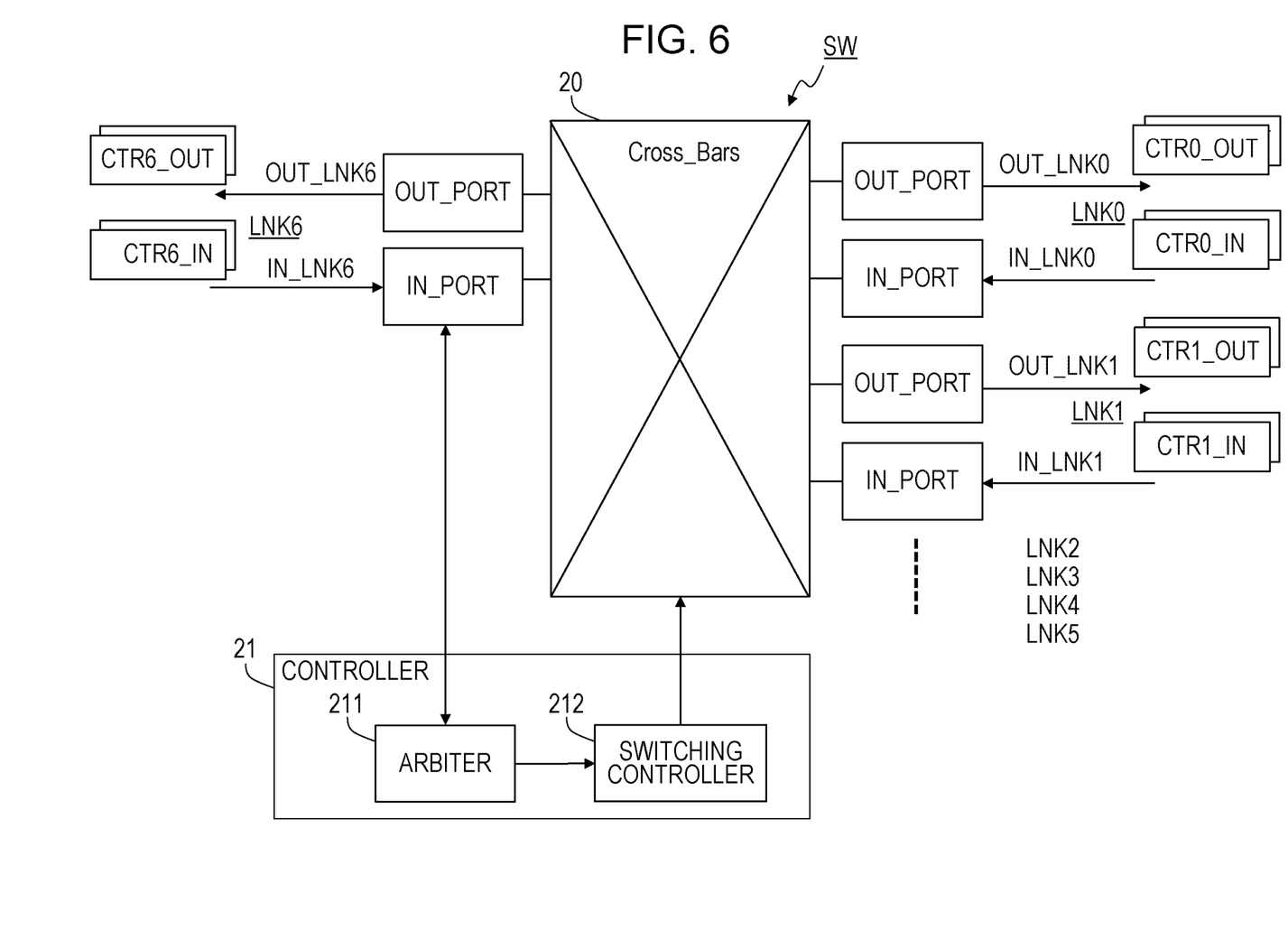
FIG. 6 illustrates an example detailed configuration of the switch.

FIG. 6 illustrates an example detailed configuration of the switch SW. In the switch SW, to the crossbar switch 20, the first bidirectional links LNK0 to LNK5 and the second bidirectional link LNK6 are coupled. As illustrated in FIG. 6, for example, the bidirectional link LNK0 includes an input link IN_LNK0 through which an input packet is transferred to the crossbar switch 20, and an output link OUT_LNK0 through which an output packet is output. The input link IN_LNK0 is coupled to an input port IN_PORT, and the output link OUT_LNK0 is coupled to an output port OUT_PORT. Each of the other bidirectional links LNK1 to LNK5 similarly has an input link and an output link, and an input port and an output port are coupled to the input link and the output link respectively. The second bidirectional link LNK6 has a similar configuration.

The controller 21 in the switch SW includes an arbiter 211 and a switching controller 212. The arbiter 211 arbitrates transfer requests to predetermined transmission destination links issued by the input ports of the links LNK0 to LNK5 and the link LNK6. The switching controller 212 controls the crossbar switch 20 so as to be switched between the input port corresponding to the transfer request determined by the arbiter and the output port of the transmission destination link. Example processing performed by the input ports IN_PORT of the links and the controller 21 will be described below.

Figure 7:
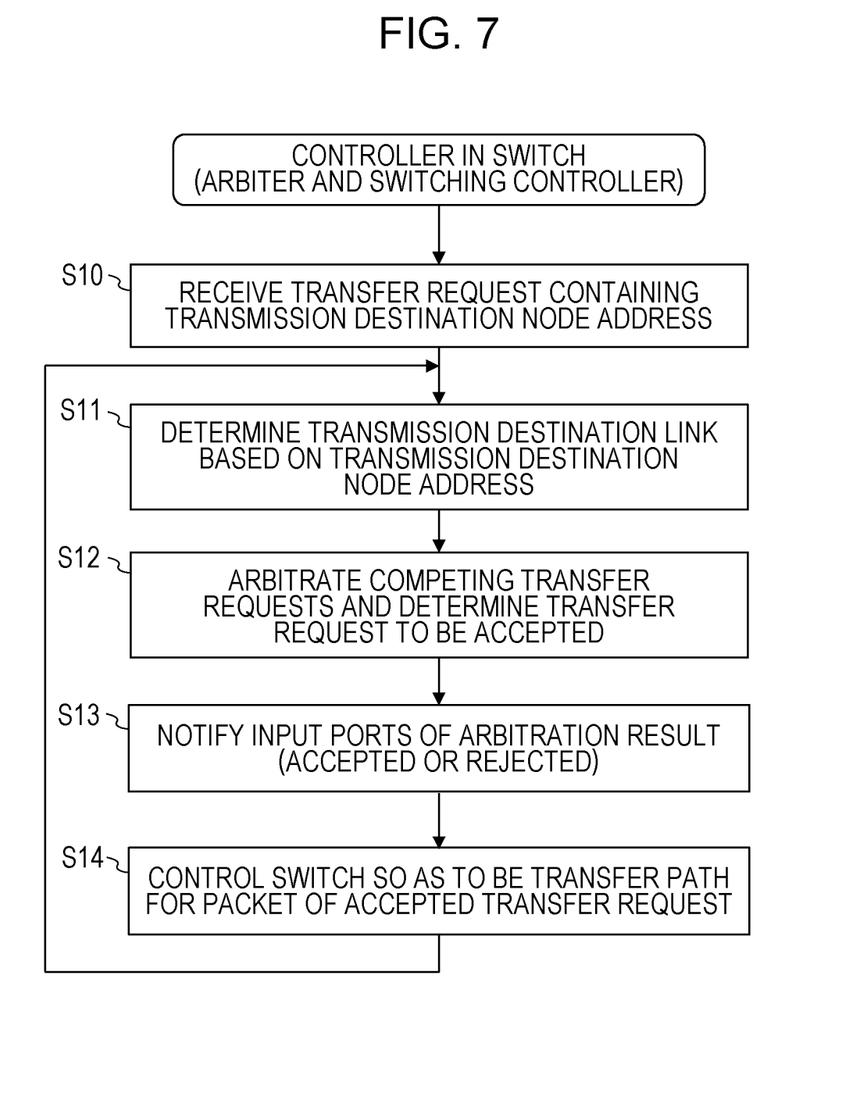
FIG. 7 is a flowchart illustrating a processing example to be performed by a controller in the switch.
Figure 8:
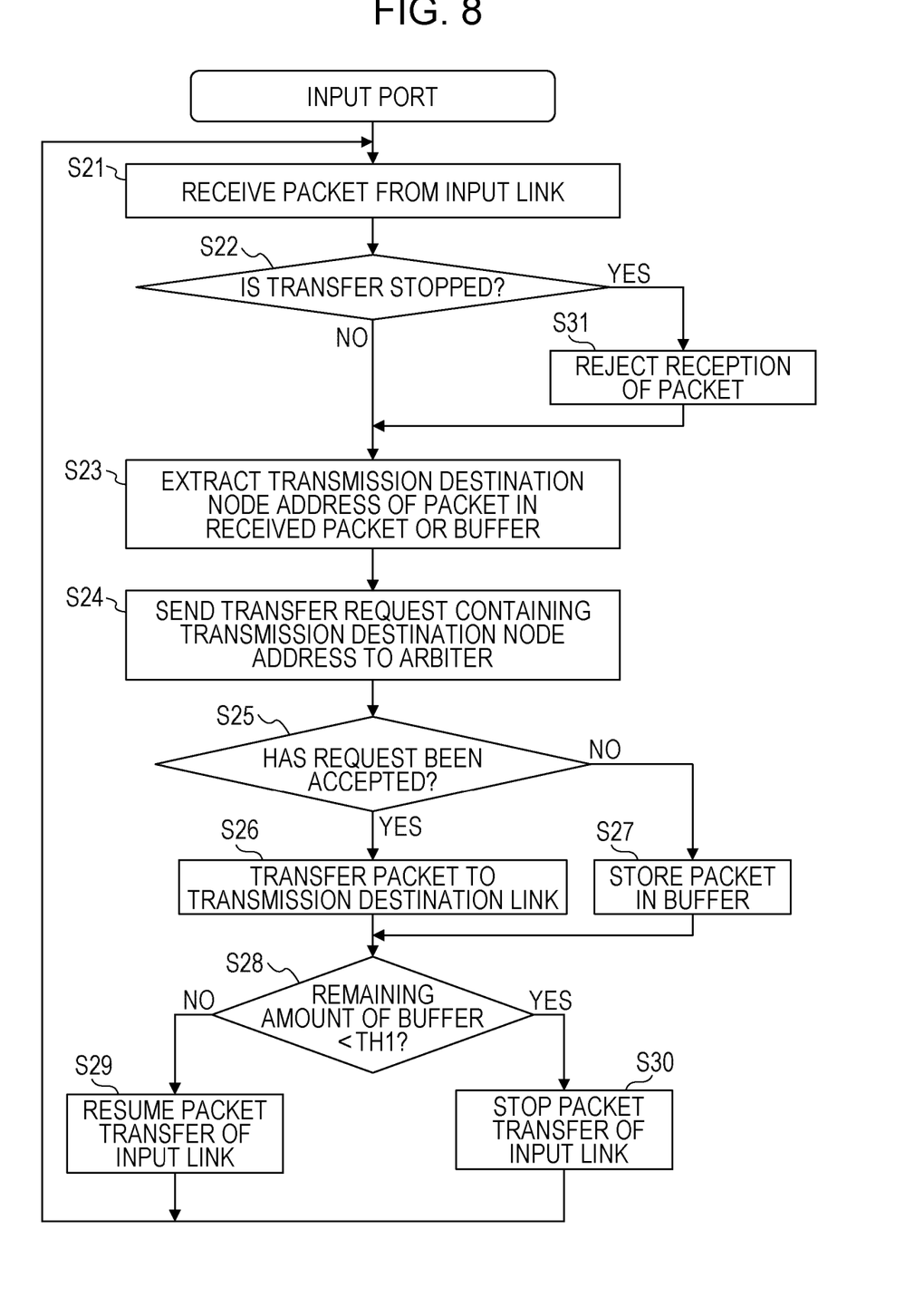
FIG. 8 is a flowchart illustrating a processing example to be performed by an input port of each link in the switch.

FIG. 7 is a flowchart illustrating example processing to be performed by the controller in the switch SW. FIG. 8 is a flowchart illustrating example processing to be performed by the input ports of the links in the switch SW. To facilitate the understanding of the processing by the controller and the input ports, switching of packets in the switch SW will be described with reference to FIG. 7 and FIG. 8.

In FIG. 8, an input port IN_PORT receives an input packet that has been transmitted over an input link (S21). When the packet transfer is not stopped (NO in step S22), the transmission destination address of the input packet is extracted (S23). The input port sends a transfer request containing the transmission destination address to the arbiter 211 (S24).

In FIG. 7, the arbiter 211 in the controller 21 of the switch receives the transfer request to the transmission destination link (S10). Based on the transmission destination node address contained in the transfer request, the arbiter 211 determines a transmission destination link of the packet (S11). In determining the transmission destination link, in accordance with a packet transfer rule in the multidimensional network, the controller determines the transmission determination link for outputting the input packet to transfer the input packet to the transmission destination node address.

When some of the transfer requests to the transmission destination link that have been received from the input ports compete, the controller arbitrates the competing transfer requests to the transfer destination link and determines a transfer request to be accepted (S12). Then, the arbiter 211 notifies the input ports of the arbitration results (accepted or rejected) (S13). Simultaneously, the switching controller 212 controls switching of the crossbar switch 20 such that the packet of the accepted transfer request is output from the output link of the requested transmission destination link (S14).

Returning to FIG. 8, when the transfer request to the transmission destination link is accepted (YES in step S25), the input port inputs the input packet to the crossbar switch 20 (S26). By the input, the input packet is output or transferred from the input port to the output link of the transmission destination link.

When the transfer request to the transmission destination link is not accepted (NO in step S25), the input port temporarily stores the input packet in the buffer in the input port (S27). As a result, the packet that is not accepted by arbitration stays in the input port without being transferred to the transmission destination link.

However, since the capacity of the buffer in the input port is limited, when the remaining amount of the buffer becomes less than a threshold value TH1 (YES in step S28), the input port stops transferring the input packet (S30).

When an input port receives a packet (S21) and the packet transfer is stopped (YES in step S22), for example, the input port rejects the reception of the received input packet (S31). Then, the input port extracts the transmission destination node address of the packet in the buffer (S23), sends the transfer request containing the transmission destination node address to the arbiter (S24). When the transfer request is accepted (S25), the input port inputs the packet in the buffer to the crossbar switch 20 (S26). By the input, the packet in the buffer is transferred to the output link of the transmission destination link. When the remaining amount of the buffer in the input port recovers to the threshold value TH1 or more (NO in step S28), the input port resumes the packet transfer and resumes accepting input packets.

Hereinafter, a profiling operation in the network switch to be performed by the processor SoC will be described.

Figure 9:
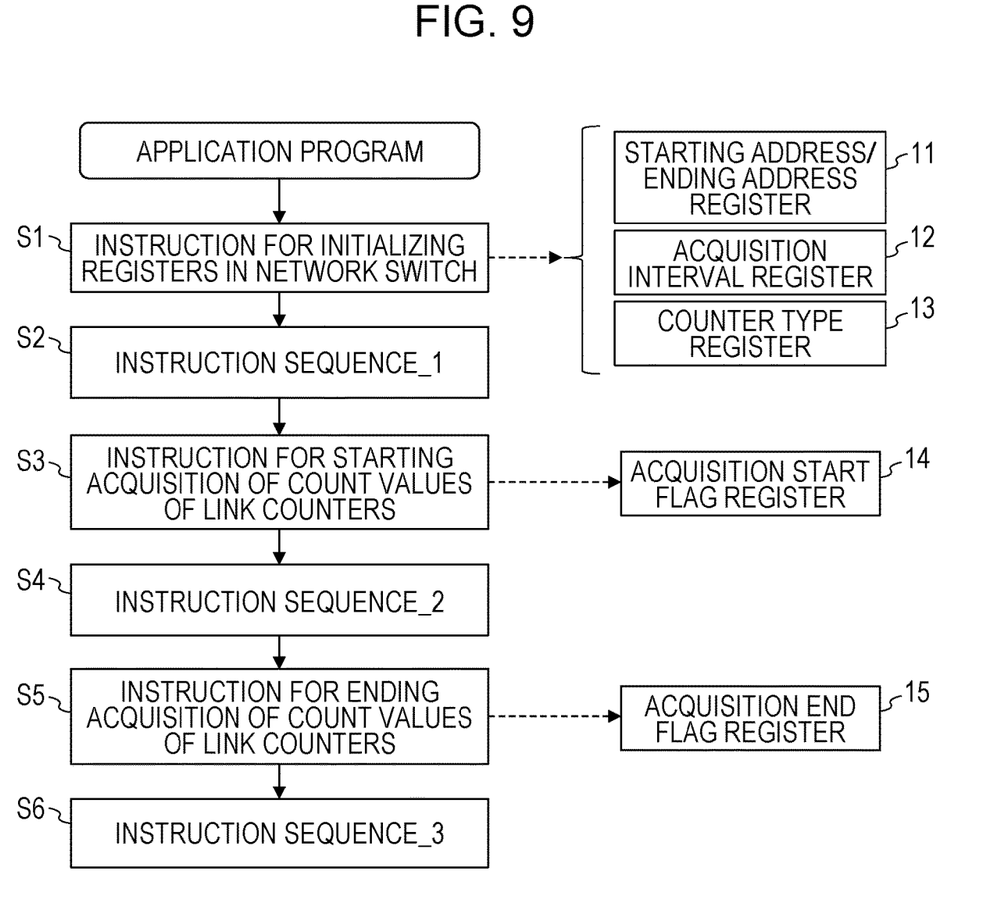
FIG. 9 illustrates a setting operation in device registers in a network switch in accordance with an application.

FIG. 9 illustrates a setting operation in the device registers in the network switch in accordance with an application. The application program includes an instruction S1 for initializing the registers in the network switch, an instruction sequence_1 (S2), an instruction S3 for starting acquisition of count values of link counters, an instruction sequence_2 (S4), an instruction for ending acquisition of count values of link counters (S5), and an instruction sequence_3 (S6). Based on profiling intended by a programmer, the initialization instruction S1, the acquisition start instruction S3, and the acquisition end instruction S5 are described at predetermined positions in the instruction sequence of the application program.

The processor PRC that executes the application program executes the initialization instruction S1 for the registers to set a starting address and an ending address of an area for storing visualization information in the main memory to the starting address/ending address register 11. The processor PRC executes the initialization instruction S1 for the registers to set an interval for acquiring visualization information to the acquisition interval register 12 and also sets counter types of the acquisition targets to the counter type register 13. The data of the counter types of the acquisition targets has, for example, a bit length corresponding to the total number of the link counters. In the data, for example, a bit corresponding to a link counter whose count value is to be acquired is set to "1" and a bit corresponding to a link counter that is not an acquisition target is set to "0".

After executing the instruction sequence_1 (S2), the processor PRC that executes the application program executes the instruction S3 for starting acquisition of count values of link counters, and sets "1" that means a start flag to the acquisition start flag register 14. When the processor PRC sets the start flag to the acquisition start flag register 14, the processor PRC reads a time stamp in the timer counter 10 in the network switch and stores the time stamp in the main memory.

After the start flag is set to the acquisition start flag register 14, the second DMA controller (DMA_2) in the network switch acquires count values of the link counters that have been set as the acquisition targets by the counter types at each acquisition interval, and stores the acquired count values in the count value buffer CNT_BUF in the order of the acquisition target counters that have been set in the counter type register. Simultaneously, the second DMA controller also stores the time stamp in the timer counter 10 at the time of the acquisition in the count value buffer. Then, the second DMA controller (DMA_2) stores (writes) the count values CNT0, CNT2, and CNT4 and the time stamp T_stp in the count value buffer CNT_BUF to the main memory M_MEM via the memory controller MC as illustrated in FIG. 3. The storing operation to the main memory is performed by direct memory access without the control by the processor PRC.

The second DMA controller (DMA_2) repeats the acquisition of count values of the link counters and the storage of the count values in the main memory while the processor PRC is executing the instruction sequence_2 (S4). Since the second DMA in the network switch performs the acquisition of count values that are visualization information and the storage of the count values in the main memory without the control of the processor PRC, a decrease in the throughput of execution of the instruction sequence_2 (S4), delay of transfer packets, and the like due to the processor PRC can be reduced.

After executing the instruction sequence_2 (S4), the processor PRC executing the application program executes the instruction S5 for ending acquisition of count values of link counters, and sets the acquisition end flag "1" that means an end flag to the acquisition end flag register 15. In response to the setting, the second DMA controller (DMA_2) ends the acquisition of count values and the storage of the count values in the main memory. Then, the processor PRC executes the instruction sequence_3 (S6).

Figure 10:
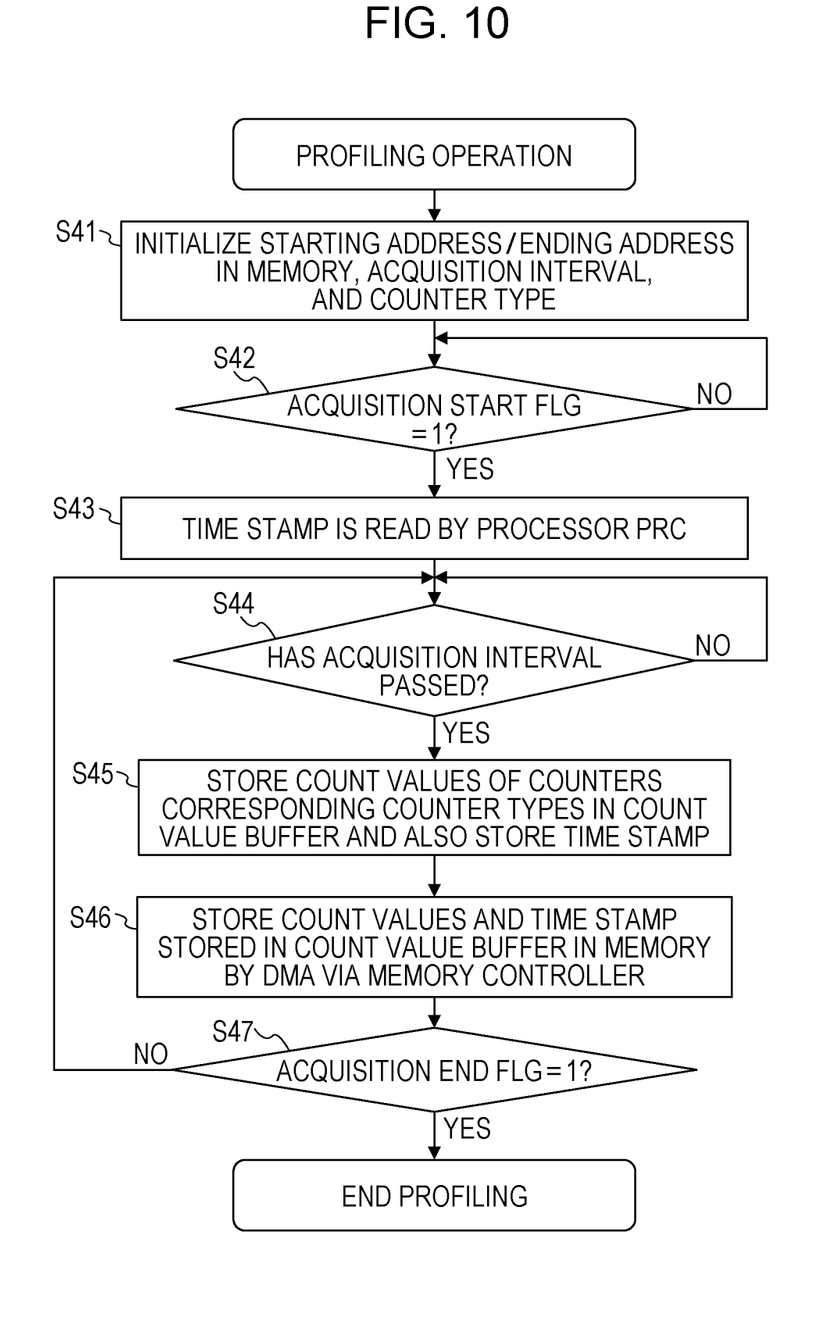
FIG. 10 is a flowchart illustrating a profiling operation to be performed by a second DMA (DMA_2) in a network switch.

FIG. 10 is a flowchart illustrating a profiling operation to be performed by the second DMA (DMA_2) in the network switch. Although the description partially overlaps with the above description, a profiling operation to be performed by the second DMA in the network switch will be described with reference to FIG. 10.

First, in the initialization processing, the processor PRC sets a starting address and an ending address of an area for storing visualization information in the main memory to the starting address/ending address register 11, sets an acquisition interval to the acquisition interval register 12, and sets counter type data for count value acquisition to the counter type register 13, respectively (S41).

After the acquisition start flag is set to the acquisition start flag register 14 (YES in step S42), the second DMA controller stores count values of the acquisition target counters that have been set to the counter type register in the count value buffer CNT_BUF at each acquisition interval that has been set to the acquisition interval register (YES in step S44). The second DMA controller also stores, in the count value buffer CNT_BUF, the time stamp in the timer counter 10 that indicates the time of the acquisition of the count values (S45). The second DMA controller stores the acquired count values and time stamp in the count value buffer via the memory controller in the main memory by DMA (S46). When the processor PRC sets the acquisition start flag, the processor PRC reads a time stamp in the timer counter 10 in the network switch and stores the time stamp in the main memory (S43).

The second DMA controller repeats the operations in steps 44 to 46 until the acquisition end flag is set to the acquisition end flag register 15 (while step S46 is NO). When the processor PRC sets the acquisition end flag to the acquisition end flag register 15 (YES in step S46), the second DMA controller ends the operations in steps 44 to 46. The processor PRC may read the time stamp in the timer counter at the time of the set of the acquisition end flag and store the time stamp in the main memory.

Figure 11:
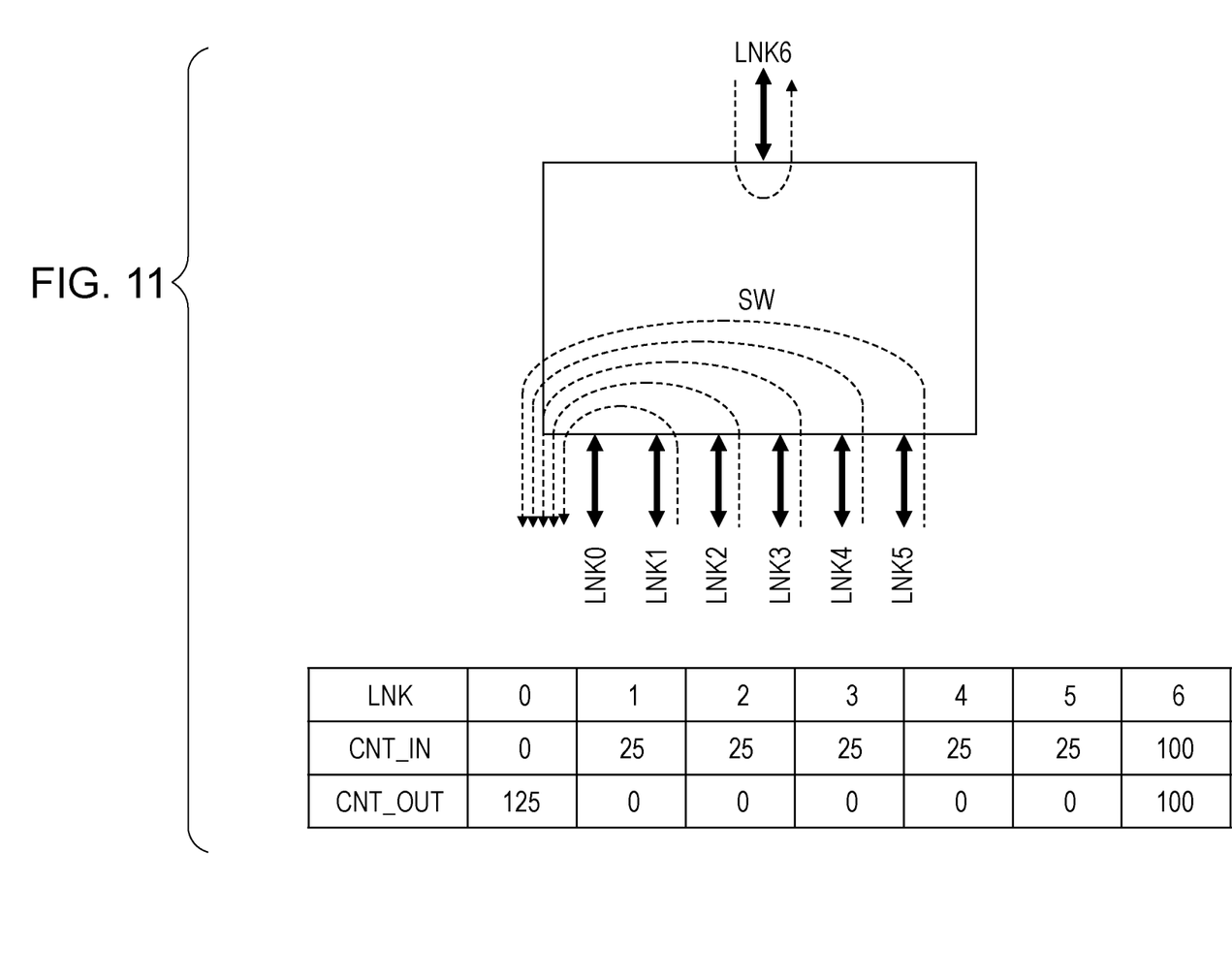
FIG. 11 illustrates an example of the number of packets in each link, which is one of visualization information.

FIG. 11 illustrates an example of the number of packets in each link, which is one of visualization information. FIG. 11 illustrates the switch SW in the network switch for performing switching between the first links LNK0 to LNK5 and the second link LNK6. The broken lines illustrate paths of packets that are transferred from links to different links via the switch that has been switched. In this example, all packets that have been input from the first links LNK1 to LNK5 are transferred to the first link LNK0, and all packets input from the second link LNK6 are transferred to the same link LNK6.

As described above, each link has the input link and the output link, and each of the input link and output link has a link counter that counts the number of packets. In the example table in FIG. 11, count values (the number of packets) CNT_IN of the link counters of the input links and count values (the number of packets) CNT_OUT of the link counters of the output links of the links LNK0 to LNK6 are provided.

According to the table, the number of counts CNT_IN of the respective link counters of the input links of the links LNK1 to LNK5 are 25 packets/acquisition interval, and the number of counts CNT_OUT of the output link of the link LNK0 is 125 packets/acquisition interval. The number of counts CNT_IN of the input link of the link LNK6 is 100 packets/acquisition interval, and the number of counts CNT_OUT of the output link is also 100 packets/acquisition interval While the processor SoC according to the embodiment is executing the application program, the second DMA in the network switch acquires the number of packets, data amounts, or the like that have been counted by the link counters provided in the input link and the output link of each link coupled to the switch from the link counters at a predetermined acquisition interval from a predetermined timing. Then, the second DMA stores the acquired count values and the time stamp at the time of the acquisition in the main memory by direct memory access.

The table in FIG. 11 illustrates examples of count values of the link counters at a predetermined interval. The predetermined interval is, for example, a coarse time of granularity, for example, several milliseconds that enables a human to visualize the change.

As an example for visualizing the link utilization of the switch, in an image of links between a plurality of nodes, each link may be displayed in a color that corresponds to the number of packets or the amount of data at each time interval. For example, when the number is large, the link may be displayed in red, when the number is middle, in yellow, and when the number is small, in green. By changing the colors of the links at each time interval with time and displaying the image, the change of the utilization rates of the links of the switch can be visualized for a human.

Accordingly, in the embodiment, while an application program under development is executed, count values of link counters are acquired together with a time stamp, and the number of packets or data amounts of links are visualized and displayed. The visualization information enables the developer to know the tendency of the link utilization of the switch while the application program is being executed and to use the information to improve the application.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
a memory;
a processor circuit;
a memory controller coupled to the processor circuit, the memory controller being configured to control access to the memory; and
an interconnect coupled to the processor circuit, the interconnect being configured to control communication to a plurality of first links coupled to other processors, the interconnect including
a network switch configured to perform switching between the first links and a second link to its own processor,
link counters provided to input links and output links of the first links and the second link respectively, the link counters being configured to count at least the number of packets passing through the input links and the output links, and
a recorder configured to store the count values of the link counters in the memory via the memory controller without transferring the count values to the processor circuit.

2. The processor according to claim 1,
wherein, each of the link counters includes a packet number counter configured to count the number of the packets and a data amount counter configured to count a data amount of the packets.

3. The processor according to claim 2,
wherein the interconnect further includes
a counter type register configured to set a link counter type of the link counters, the count value of which is to be stored in the memory, and
an acquisition interval register configured to set an acquisition interval for acquiring the count values to be stored in the memory from the link counters.

4. The processor according to claim 3,
wherein the interconnect further includes a timer, and
the recorder acquires count values of the link counters corresponding to the counter type that has been set to the counter type register, acquires a time stamp in the timer at every acquisition interval based on the time of the timer and stores the acquired count values and the time stamp in the memory.

5. The processor according to claim 4,
wherein the interconnect further includes
an acquisition start flag register configured to set a start of acquisition of the count values and
an acquisition end flag register configured to set an end of acquisition of the count values, and
the recorder acquires the count values and the time stamp and stores the count values and time stamp in the memory at the acquisition interval from the time the processor circuit sets an acquisition start flag to the acquisition start flag register to the time the processor circuit sets an acquisition end flag to the acquisition end flag register.

6. The processor according to claim 5,
wherein the interconnect further includes
an address range register configured to set an address range in a storage area for storing the count values and the time stamp in the memory, and
the processor circuit sets an address range in the memory to the address range register.

7. The processor according to claim 1,
wherein the network switch includes
input ports provided in the input links of the first links and the second link respectively and output ports provided in the output links of the first links and the second link respectively,
the input ports issue packet transfer requests for requesting output of packets to transmission destination links based on transmission destination addresses of the packets input to the input ports, the network switch further includes
an arbiter configured to accept one of the packet transfer requests issued by the input ports and competing with each other in a transmission destination link, and
a switch controller configured to control switching such that the packet corresponding to the accepted packet transfer request is transferred from the input link to the output link of the transmission destination link, and
when the packet transfer request is accepted, the input port inputs the packet to the network switch, and when the packet transfer request is not accepted, the input port performs buffering of the packet.

8. The processor according to claim 1,
wherein the processor circuit and the interconnect are provided in the same chip.

9. An information processing apparatus comprising:
a plurality of processors; and
a plurality of links provided between the processors in a plurality of axis directions, the links being communication paths between the processors,
wherein each of the processors includes
a processor circuit,
a memory controller coupled to the processor circuit, the memory controller being configured to control access to a memory, and
an interconnect coupled to the processor circuit, the interconnect being configured to control communication to a plurality of first links coupled to other processors,
the interconnect includes
a network switch configured to perform switching between the first links and a second link to its own processor,
link counters provided to input links and output links of the first links and the second link respectively, the link counters being configured to count at least the number of packets passing through the input links and the output links, and
a recorder configured to store count values of the link counters in the memory via the memory controller without transferring the count values to the processor circuit.

10. The information processing apparatus according to claim 9,
wherein, each of the link counters includes a packet number counter configured to count the number of the packets and a data amount counter configured to count a data amount of the packets.

11. The information processing apparatus according to claim 10,
wherein the interconnect further includes
a counter type register configured to set a link counter type of the link counters, the count value of which is to be stored in the memory, and
an acquisition interval register configured to set an acquisition interval for acquiring the count values to be stored in the memory from the link counters.

12. The information processing apparatus according to claim 11,
wherein the interconnect further includes a timer, and
the recorder acquires count values of the link counters corresponding to the counter type that has been set to the counter type register, acquires a time stamp in the timer at every acquisition interval based on the time of the timer and stores the acquired count values and the time stamp in the memory.

13. The information processing apparatus according to claim 12,
wherein the interconnect further includes
an acquisition start flag register configured to set a start of acquisition of the count values and
an acquisition end flag register configured to set an end of acquisition of the count values, and
the recorder acquires the count values and the time stamp and stores the count values and time stamp in the memory at the acquisition interval from the time the processor circuit sets an acquisition start flag to the acquisition start flag register to the time the processor circuit sets an acquisition end flag to the acquisition end flag register.

14. The information processing apparatus according to claim 13,
wherein the interconnect further includes
an address range register configured to set an address range in a storage area for storing the count values and the time stamp in the memory, and
the processor circuit sets an address range in the memory to the address range register.

15. The information processing apparatus according to claim 9,
wherein the network switch includes
input ports provided in the input links of the first links and the second link respectively and output ports provided in the output links of the first links and the second link respectively,
the input ports issue packet transfer requests for requesting output of packets to transmission destination links based on transmission destination addresses of the packets input to the input ports,
the network switch further includes
an arbiter configured to accept one of the packet transfer requests issued by the input ports and competing with each other in a transmission destination link, and
a switch controller configured to control switching such that the packet corresponding to the accepted packet transfer request is transferred from the input link to the output link of the transmission destination link, and
when the packet transfer request is accepted, the input port inputs the packet to the network switch, and when the packet transfer request is not accepted, the input port performs buffering of the packet.

16. The information processing apparatus according to claim 9,
wherein the processor circuit and the interconnect are provided in the same chip.

\* \* \* \* \*